United States Patent
Takahashi

(10) Patent No.: US 7,078,119 B2
(45) Date of Patent: Jul. 18, 2006

(54) FUEL CELL SYSTEM AND METHOD FOR GENERATING ELECTRICITY FROM A FUEL CELL SYSTEM COMPRISING A FUEL CELL STACK DIVIDED INTO SUB-TRACKS

(75) Inventor: Shinichi Takahashi, Kanagawa (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 39 days.

(21) Appl. No.: 10/878,224

(22) Filed: Jun. 29, 2004

(65) Prior Publication Data

US 2005/0287406 A1  Dec. 29, 2005

(51) Int. Cl.
*H01M 8/04* (2006.01)

(52) U.S. Cl. .......................... 429/24; 429/12; 429/19; 429/20; 429/21; 429/22; 429/23; 429/25

(58) Field of Classification Search ............... 429/24, 429/12, 19–25
See application file for complete search history.

(56) References Cited

U.S. PATENT DOCUMENTS

| | | | |
|---|---|---|---|
| 5,853,910 A | 12/1998 | Tomioka et al. | |
| 6,096,449 A | 8/2000 | Fuglevand et al. | |
| 6,294,278 B1 | 9/2001 | Wohr et al. | |
| 6,387,556 B1 | 5/2002 | Fuglevand et al. | |
| 6,953,632 B1* | 10/2005 | Hayashi et al. | 429/26 |
| 2004/0053092 A1* | 3/2004 | Kato et al. | 429/22 |

\* cited by examiner

Primary Examiner—Raymond Alejandro
Assistant Examiner—Cynthia Lee
(74) Attorney, Agent, or Firm—McDermott Will & Emery LLP

(57) ABSTRACT

Methods of generating electricity from a fuel cell system and fuel cell systems are provided. The fuel cell system comprises a fuel cell stack divided into an anode-side sub-stack, central sub-stack, and cathode-side sub-stack by current collectors positioned at each end of the fuel cell stack and two current collectors positioned at intermediate positions of the fuel cell stack. A collector switch connects the current collectors positioned at each end of the fuel cell stack and the current collectors at intermediate positions to a load. The fuel cell system further comprises a means of controlling the collector switch and a means of measuring the temperature of the fuel cell stack. The collector switch is controlled with the means of controlling the collector switch so that the central sub-stack generates electricity before the anode-side sub-stack and the cathode-side sub-stack start to generate electricity. The temperature of the fuel cell stack is measured using the means of measuring the temperature. The collector switch is controlled with the means of controlling the collector switch so that electricity is generated by the anode-side sub-stack, cathode-side sub-stack, and central sub-stack when the means of measuring the temperature of the fuel cell stack measures a temperature greater than or equal to a predetermined temperature. In other embodiments of the invention the means of controlling the collector switch controls the collector switch in response to measurements of the ambient temperature adjacent the fuel cell stack, the voltage across the central sub-stack, or the interval of time from the start of electrical generation of the central sub-stack.

20 Claims, 7 Drawing Sheets

FUEL CELL SYSTEM AND METHOD FOR GENERATING ELECTRICITY FROM A FUEL CELL SYSTEM COMPRISING A FUEL CELL STACK DIVIDED INTO SUB-TRACKS

TECHNICAL FIELD OF THE INVENTION

This invention relates to fuel cell systems and in particular fuel cell systems for use in motor vehicle applications.

BACKGROUND OF THE INVENTION

Fuel cells have been developed as alternative power sources for motor vehicles, such as electrical vehicles. A fuel cell is a demand-type power system in which the fuel cell operates in response to the load imposed across the fuel cell. Typically, a liquid hydrogen containing fuel, for example, gasoline, methanol, diesel, naphtha, etc. serves as a fuel supply for the fuel cell after the fuel has been converted into a gaseous stream containing hydrogen. The conversion to the gaseous stream is usually accomplished by passing the fuel through a fuel reformer to convert the liquid fuel to a hydrogen gas stream that usually contains other gases such as carbon monoxide, carbon dioxide, methane, water vapor, oxygen, and unburned fuel. The hydrogen is then used by the fuel cell as a fuel in the generation of electricity for the vehicle.

A polymer electrolyte membrane type of fuel cell is generally composed of a stack of unit cells comprising a polymer electrolyte membrane enclosed between electrodes and gas diffusion layers, and further enclosed between separators that contain channels for fuel gas and oxidant gas. The stack is fixed by end plates. A current collector may be provided between the end plate and stack, or the end plate itself may function as current collector. When hydrogen is used as the fuel gas and oxygen is used as the oxidant gas, electrons are released due to a chemical reaction, and water is formed as a by-product, via the reaction:

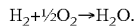

$$H_2 + \tfrac{1}{2}O_2 \rightarrow H_2O.$$

Consequently, the fuel cell is an energy source that has no adverse impact on the global environment, and has been the focus of much research for use in automobiles in recent years.

Although the water that is the product of the reaction is environmentally benign, when a large quantity of water reaction product accumulates in the fuel cell, it blocks the gas channels and the gas diffusion layers, causing a drop in electrical generation efficiency. In addition, if the fuel cell is exposed to temperatures at and below 0° C., which are common in the temperate and polar latitudes, the accumulated water freezes in the fuel cell and blocks the gas channels. It is not possible to generate electricity from frozen fuel cells when the gas channels are clogged with ice. Even if a heater is used to melt the ice, it takes time to melt the ice and thus rapid start up of an electrical vehicle is not possible with a frozen fuel cell.

Therefore, methods have been tried to reduce the quantity of water in the fuel cell stack before the stack freezes, to facilitate the generation of electricity in subfreezing ambients. One such method is to increase the flow rate of fuel gas and oxidant gas to blow the accumulated water out of the channels after electrical generation is shut down. Another method is to vacuum dry the channels. However, these methods take a substantial amount of time to dry the fuel cell to an acceptable level. This is probably because it is difficult to eliminate water from the small cavities in the gas diffusion layer and the electrode when attempting to dry the fuel cell by gas purge or vacuum drying.

When a fuel cell stack generates electricity at low temperature, the temperature does not rise uniformly throughout the stack. Along the stacking direction, the temperature in the central portion of the stack will tend to rise more rapidly and higher than portions of the fuel cell stack adjacent the end of the stack because the central portion is more distant from the ambient air. Conversely, the temperature at the end of the fuel cell stack is slow to rise, because it is nearer to the ambient air. As a result, the water produced when electricity is generated at the end of the fuel cell stack has been known to condense or freeze inside the stack, hindering the continued generation of electricity from fuel cells adjacent the end of the stack.

Time-consuming methods of drying or heating fuel cells in automotive applications are not feasible, because rapid startup is required and the fuel cell frequently cycles between operating and shut down states.

SUMMARY OF THE INVENTION

There exists a need in the fuel cell art to eliminate condensed and frozen water from the end portions of the fuel cell stack. There exists a need in the fuel cell art for a rapid and efficient startup of electrical generation at low temperatures.

There exists a need in the electrical vehicle art for electrical vehicles powered by fuel cells that rapidly and efficiently generate electricity upon demand. There exists a need in the electrical vehicle art for electrical vehicles powered by fuel cells which do not suffer from electrical generation startup delay due to frozen water blocking gas channels and gas diffusion layers.

These and other needs are met by certain embodiments of the present invention, which provide a method of generating electricity from a fuel cell system comprising providing a fuel cell system. The fuel cell system comprises a fuel cell stack divided into an anode-side sub-stack, central sub-stack, and cathode-side sub-stack by current collectors positioned at each end of the fuel cell stack and two current collectors positioned at intermediate positions of the fuel cell stack. A collector switch connects the current collectors positioned at each end of the fuel cell stack and the current collectors at the intermediate positions to a load. The fuel cell system further comprises a means of controlling the collector switch and a means of measuring the temperature of the fuel cell stack. The collector switch is controlled with the means of controlling the collector switch so that the central sub-stack generates electricity before the anode-side sub-stack and the cathode-side sub-stack start to generate electricity. The temperature of the fuel cell stack is measured using the means of measuring the temperature. The collector switch is controlled with the means of controlling the collector switch so that electricity is generated by the anode-side sub-stack, cathode-side sub-stack, and central sub-stack when the means of measuring the temperature of the fuel cell stack measures a temperature greater than or equal to a predetermined temperature.

The earlier stated needs are also met by certain embodiments of the present invention, which provide a method of generating electricity from a fuel cell system comprising providing a fuel cell system. The fuel cell system comprises a fuel cell stack divided into an anode-side sub-stack, central sub-stack, and cathode-side sub-stack by current collectors positioned at each end of the fuel cell stack and two current collectors positioned at intermediate positions of the fuel cell stack. A collector switch connects the current collectors positioned at each end of the fuel cell stack and the current collectors at the intermediate positions to a load. The fuel cell system further comprises a means of controlling the collector switch and a means of measuring the ambient temperature. The collector switch is controlled with the means of controlling the collector switch so that the central sub-stack generates electricity before the anode-side sub-stack and the cathode-side sub-stack start to generate electricity. The ambient temperature adjacent the fuel cell stack is measured using the means of measuring the ambient temperature. The collector switch is controlled with the means of controlling the collector switch so that electricity is generated by the anode-side sub-stack, cathode-side sub-stack, and central sub-stack when the means of measuring the ambient temperature measures a temperature greater than or equal to a predetermined temperature.

The earlier stated needs are also met by certain embodiments of the present invention, which provide a method of generating electricity from a fuel cell system comprising providing a fuel cell system. The fuel cell system comprises a fuel cell stack divided into an anode-side sub-stack, central sub-stack, and cathode-side sub-stack by current collectors positioned at each end of the fuel cell stack and two current collectors positioned at intermediate positions of the fuel cell stack. A collector switch connects the current collectors positioned at each end of the fuel cell stack and the current collectors at the intermediate positions to a load. The fuel cell system further comprises a means of controlling the collector switch and a timer. The collector switch is controlled with the means of controlling the collector switch so that the central sub-stack generates electricity before the anode-side sub-stack and the cathode-side sub-stack start to generate electricity. The time from the start of the generation of electricity by the central sub-stack is measured using the timer. The collector switch is controlled with the means of controlling the collector switch so that electricity is generated by the anode-side sub-stack, cathode-side sub-stack, and central sub-stack when the timer measures a predetermined interval of time.

The earlier stated needs are further met by certain embodiments of the present invention, which provide a method of generating electricity from a fuel cell system comprising providing a fuel cell system. The fuel cell system comprises a fuel cell stack divided into an anode-side sub-stack, central sub-stack, and cathode-side sub-stack by current collectors positioned at each end of the fuel cell stack and two current collectors positioned at intermediate positions of the fuel cell stack. A collector switch connects the current collectors positioned at each end of the fuel cell stack and the current collectors at the intermediate positions to a load. The fuel cell system further comprises a means of controlling the collector switch and a means for measuring the voltage of the central sub-stack. The collector switch is controlled with the means of controlling the collector switch so that the central sub-stack generates electricity before the anode-side sub-stack and the cathode-side sub-stack start to generate electricity. The voltage of the central sub-stack is measured using the means of measuring the voltage. The collector switch is controlled with the means of controlling the collector switch so that electricity is generated by the anode-side sub-stack, cathode-side sub-stack, and central sub-stack when the means of measuring the voltage measures a voltage greater than or equal to a predetermined voltage.

Furthermore, the earlier stated needs are met by certain embodiments of the present invention, which provide a fuel cell system for generating electricity. The fuel cell system comprises a fuel cell stack divided into an anode-side sub-stack, central sub-stack, and cathode-side sub-stack by current collectors positioned at each end of the fuel cell stack and two current collectors positioned at intermediate positions of the fuel cell stack. Each of the anode-side sub-stack, central sub-stack, and cathode-side sub-stack comprises a plurality of unit cells. A collector switch connects the current collectors positioned at each end of the fuel cell stack and the current collectors at the intermediate positions to a load. A means of controlling the collector switch controls the collector switch so that the central sub-stack generates electricity before the anode-side fuel sub-stack and said cathode-side sub-stack start to generate electricity. The fuel cell system further comprises a plurality of means of measuring the temperature of said fuel cell stack wherein one of the means of measuring the temperature of the fuel cell stack is positioned on or in the interior of the central sub-stack and another of the plurality of means of measuring the temperature of the fuel cell stack is positioned on or in the interior of either the anode-side or cathode-side sub-stack.

In addition, the earlier stated needs are met by certain embodiments of the present invention, which provide a fuel cell system for generating electricity. The fuel cell system comprises a fuel cell stack divided into an anode-side sub-stack, central sub-stack, and cathode-side sub-stack by current collectors positioned at each end of the fuel cell stack and two current collectors positioned at intermediate positions of the fuel cell stack. Each of the anode-side sub-stack, central sub-stack, and cathode-side sub-stack comprise a plurality of unit cells. A collector switch connects the current collectors positioned at each end of the fuel cell stack and the current collectors at intermediate positions to a load. A means of controlling the collector switch controls the collector switch so that the central sub-stack generates electricity before anode-side fuel sub-stack and said cathode-side sub-stack start to generate electricity. A timer, which communicates with the means of controlling the collector switch, measures time from the start of the generation of electricity by the central sub-stack.

The present invention addresses the need for a fuel cell system that rapidly and efficiently generates electricity at sub-freezing temperatures. The present invention further addresses the need for a method that rapidly and efficiently activates a fuel cell system at subfreezing temperatures. The present invention also addresses the need for a motor vehicle with a fuel cell system that rapidly and efficiently starts up in subfreezing ambients.

The foregoing and other features, aspects, and advantages of the present invention will become apparent in the following detailed description of the present invention when taken in conjunction with the accompanying drawings.

DETAILED DESCRIPTION OF THE INVENTION

Figure 1:
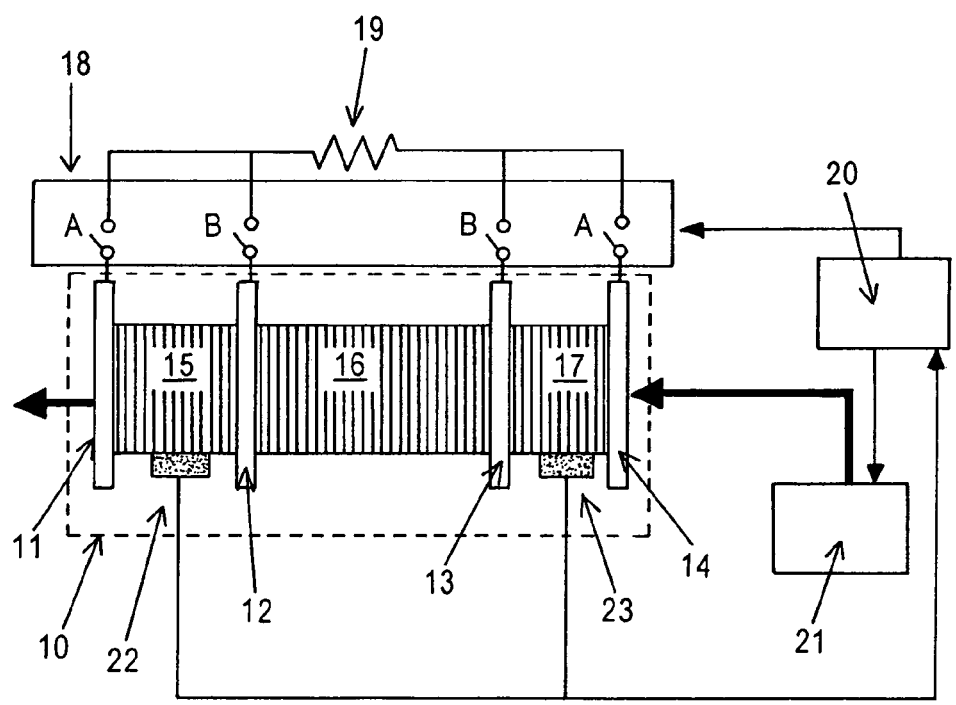
FIG. 1 schematically illustrates a cross-section of a fuel cell system according to an embodiment of the present invention.

The present invention provides methods of generating electricity in subfreezing temperatures. The present invention also provides fuel cell systems that rapidly and efficiently generate electricity in subfreezing temperatures. The present invention further provides motor vehicles with fuel cell systems that rapidly and efficiently start up in subfreezing ambients. These benefits are provided by providing a fuel cell system with a fuel cell stack divided into an anode-side sub-stack, central sub-stack, and cathode-side sub-stack by current collectors positioned at each end of the fuel cell stack and in intermediate positions along the fuel cell stack.

In certain embodiments of the present invention, a fuel cell stack is divided into three sub-stacks: an anode-side sub-stack, central sub-stack, and cathode-side sub-stack. The fuel cell stack is divided by current collectors at the ends of the fuel cell stack and at least two intermediate current collectors. A collector switch connects the current collector at the end of the fuel cell stack and the intermediate current collectors to a load. A means of controlling the collector switch is provided, and the means of controlling the collector switch controls the collector switch so that the central sub-stack generates electricity before the anode-side sub-stack and cathode-side sub-stack start to generate electricity.

Electricity can be generated using only a single sub-stack, a plurality of sub-stacks or the entire fuel cell stack of the present invention. The sub-stacks at the end of the fuel cell stack, where the water produced is more likely to condense or freeze, can be controlled so that sub-stacks at the end of the stack do not generate electricity at low ambient temperatures, such as 0° C. or lower. During startup of the fuel cell system at low temperatures, electricity is generated in the central portions of the fuel cell stack, where water is less likely to condense or freeze. Although, the designed maximum power of the fuel cell may not be obtained from the fuel cell stack at low temperature startup, power can be obtained immediately upon activation of the fuel cell stack.

In certain embodiments of the present invention, the fuel cell stack can be divided into four or more divisions by using three or more intermediate current collectors. However, because the cells detrimentally affected by low ambient temperature are the cells at the anode and cathode sides of the fuel cell stack, it is not necessary to further divide the fuel cell stack. The use of three sub-stacks, an anode-side sub-stack, cathode-side sub-stack, and central sub-stack, is sufficient to avoid deleterious low temperature performance. Furthermore, an increase in the number of sub-stacks makes the configuration and control of the fuel cell stack more complex, and an increase in intermediate current collectors increases the resistance loss of the fuel cell stack as a whole. Therefore, it is not desirable to divide the stack into four or more sub-stacks.

In certain embodiments of the present invention, the anode-side sub-stack and cathode-side sub-stack are each composed of at least three unit cells. In certain other embodiments of the present invention, the anode-side sub-stack and cathode-side sub-stack each comprise five unit cells.

In certain embodiments of the present invention, a means of measuring the temperature of the fuel cell stack is provided. If the means of measuring the temperature of the fuel cell stack is higher than 0° C. before the fuel cell stack starts to generate electricity the means of controlling the collector switch controls the collector switch so that the entire fuel cell stack starts to generate electricity immediately. This represents the normal operating condition of the fuel cell stack, in which the water produced in the fuel cell stack does not condense or freeze in any of the unit cells.

In certain embodiments of the present invention, the means of measuring the temperature of the fuel cell stack measures the temperature of the surface or the interior of the central sub-stack and at least one of either the cathode-side sub-stack or the anode-side sub-stack. Therefore, electrical generation start-up in the entire fuel cell stack can be controlled based on the temperature of the anode-side or cathode-side sub-stacks.

In certain embodiments of the present invention, the means of measuring the temperature of the fuel cell stack measures the temperature of at least one of the fuel gas, oxidant gas, or the coolant liquid discharged from the fuel cell stack. Therefore, the start-up of electrical generation in the entire fuel cell stack can be controlled, based on various temperature indicia of the fuel cell stack.

In certain embodiments of the present invention, a means of measuring the ambient temperature adjacent the fuel cell stack is provided. If the means of measuring the ambient temperature measures a temperature higher than 0° C. then the means of controlling the collector switch controls the collector switch so that the entire fuel cell stack starts to generate electricity immediately after the central sub-stack starts to generate electricity. Therefore, the normal fuel cell system generation of electricity starts immediately after fuel cell system start-up in conditions where the water produced in the fuel cell stack does not condense or freeze.

In certain embodiments of the present invention, a means of measuring the temperature of the fuel cell stack is provided. The means of controlling the collector switch controls the collector switch so that the entire fuel cell stack generates electricity when the temperature of the fuel cell stack reaches a predetermined temperature. Therefore, the entire fuel cell stack, including the anode-side and cathode-side sub-stacks, starts to generate electricity when there is no longer any risk that the water produced in the fuel cell stack will condense or freeze.

In certain embodiments of the present invention, the means of controlling the collector switch controls the collector switch so that the entire fuel cell stack generates electricity when the temperature of the surface or interior of the anode-side sub-stack or cathode-side sub-stack reaches a predetermined temperature. Therefore, the change-over to the generation of electricity by the entire fuel cell stack occurs after confirming that the temperature has risen, in the anode-side sub-stack or cathode-side sub-stack, above the temperature where the water produced would condense or freeze.

In certain embodiments of the present invention, a timer that measures time in synchronization with the start of electrical generation by the central sub-stack is provided. The means of controlling the collector switch controls the collector switch so that the entire fuel cell stack generates electricity when the timer measures a predetermined time. Therefore, the entire fuel cell stack, including the anode-side and cathode-side sub-stacks, starts to generate electricity when there is no longer any risk that the water produced in the fuel cell stack will condense or freeze.

In certain embodiments of the present invention, a means of measuring the voltage of the central sub-stack is provided. The means of controlling the collector switch controls the collector switch so that the entire said fuel cell stack generates electricity when the voltage of the central sub-stack reaches a predetermined voltage. Therefore, the entire fuel cell stack, including anode-side and cathode-side sub-stacks, starts to generate electricity when there is no longer any risk that the water produced in the fuel cell stack will condense or freeze.

EXAMPLE 1

FIG. 1 shows the outline of an embodiment of the present invention as described in Example 1. A polymer electrolyte membrane fuel cell stack 10, which is composed of fifty unit cells sandwiched between an anode-side current collector 11 and a cathode-side current collector 14. An intermediate current collector (anode-side) 12 and an intermediate current collector (cathode-side) 13 are provided at a distance of five unit cells from the anode-side current collector 11 and cathode-side current collector 14, respectively. A collector switch 18 is provided between each current collector 11, 12, 13, 14 and a load 19. The collector switch 18 is controlled by a means of controlling the collector switch 20. An anode-side sub-stack temperature sensor 22 is provided on the surface of the anode-side sub-stack 15, and a cathode-side sub-stack temperature sensor 23 is provided on the surface of the cathode-side sub-stack 17. Information from the two temperature sensors 22, 23 is transmitted to the means of controlling the collector switch 20.

Figure 2:
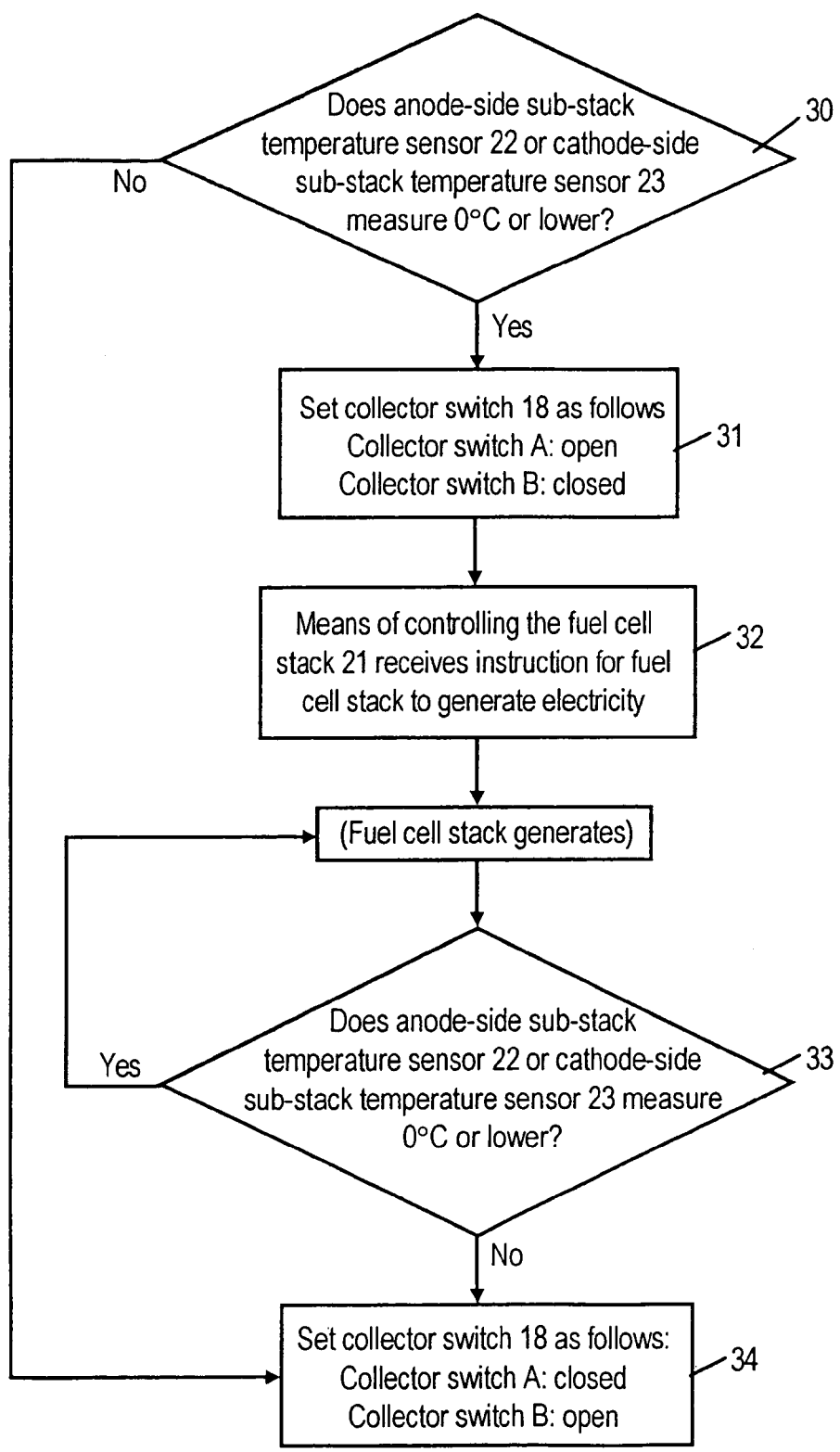
FIG. 2 is a flow chart illustrating the operation of the means of controlling the collector switch in response to the temperature of the fuel cell stack.

The means of controlling collector switch 20 controls the collector switch 18 in accordance with the flow chart shown in FIG. 2. At step 30, the freeze status of anode-side sub-stack 15 and cathode-side sub-stack 17 is determined, based on information from the anode-side sub-stack temperature sensor 22 and the cathode-side sub-stack temperature sensor 23. If the temperatures of both sub-stacks rises above 0° C., it is determined that both sub-stacks are not frozen, and the process advances without further change to step 34, where the entire polymer electrode membrane fuel cell stack 10 starts to generate electricity. If, at step 30, at least one of the two temperature sensors 22, 23 measures 0° C. or lower, the collector switch 18 is set so that only the central sub-stack 16 can generate electricity, as noted at step 31. The means of controlling the collector switch 20 communicates the means of controlling the fuel cell stack 21. Subsequently, at step 32, the means of controlling the fuel cell stack 21 receives instructions from the means of controlling the collector switch 20 to commence generating electricity. The means of controlling the fuel cell stack 21 communicates with the fuel cell stack 10 and controls the pressure, flow rate, temperature, and dew point of the hydrogen and air introduced into the polymer electrolyte membrane fuel cell stack 10. At step 33, the temperatures of anode-side sub-stack temperature sensor 22 and cathode-side sub-stack temperature sensor 23 are continuously monitored during electrical generation, and when the two temperature sensors measure temperatures above 0° C., the collector switch 18 is set as shown at step 34. As a result of this control, the entire polymer electrolyte membrane fuel cell stack 10 generates electricity.

EXAMPLE 2

Figure 3:
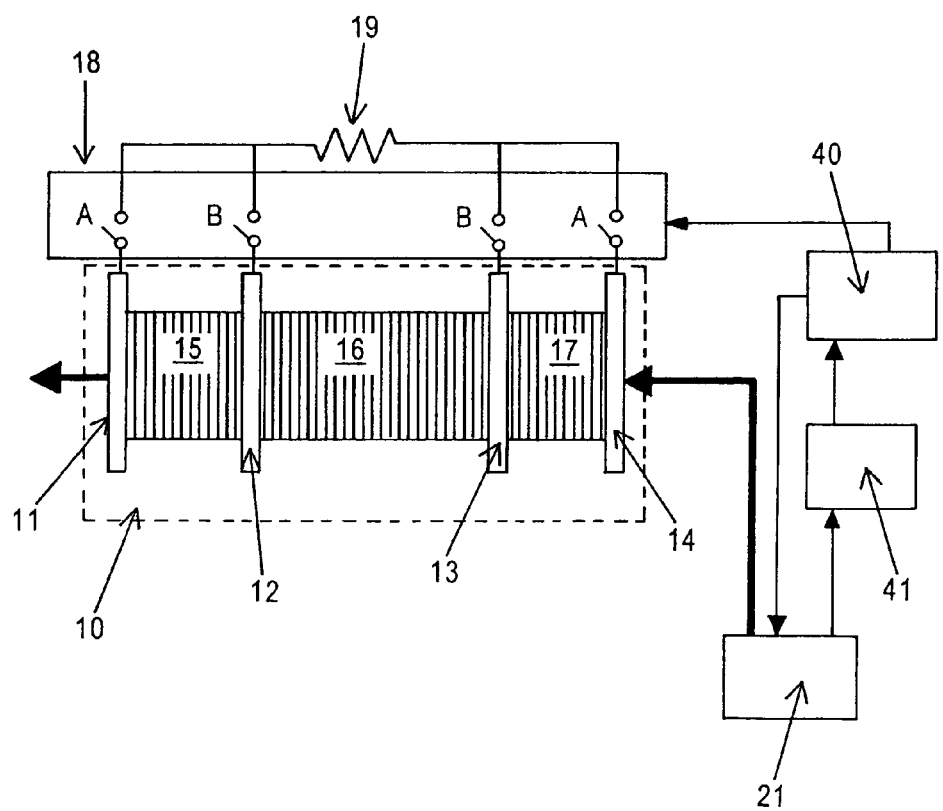
FIG. 3 schematically illustrates a cross-section of a fuel cell system according to another embodiment of the present invention.
Figure 4:
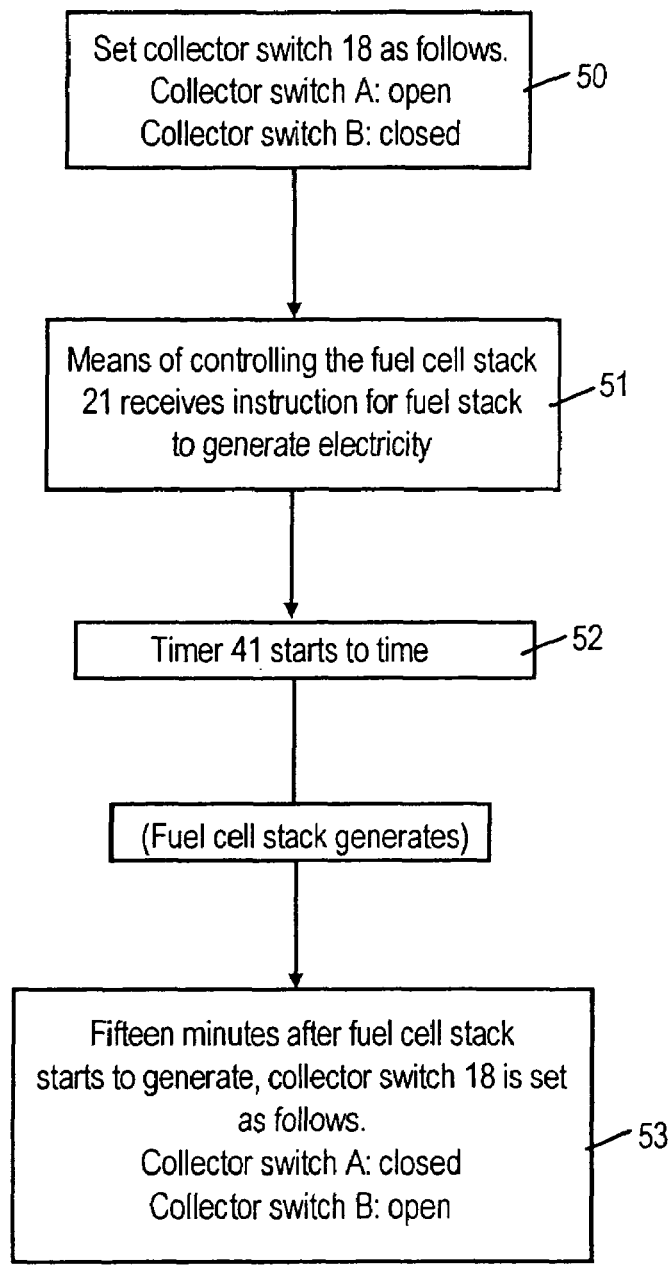
FIG. 4 is a flow chart illustrating the operation of the means of controlling the collector switch in response to a timer.

FIG. 3 shows the outline of an embodiment of the present invention as described in Example 2. A means of controlling the collector switch 40 controls the collector switch 18 in accordance with the flowchart shown in FIG. 4. Because the collector switch 18 is set as noted at step 50, only the central sub-stack 16 can generate electricity. The means of controlling the collector switch 40 communicates with the means of controlling the fuel cell stack 21. Subsequently, at step 51, the means of controlling the fuel cell stack 21 receives instructions from the means of controlling the collector switch 40 to generate electricity. The means of controlling the fuel cell stack 21 communicates with the fuel cell stack 10 and the means of controlling the fuel cell stack 21 controls the pressure, flow rate, temperature, and dew point of the hydrogen and air introduced into the polymer electrolyte membrane fuel cell stack 10. When the polymer electrode membrane fuel cell stack 10 starts to generate electricity at step 51 the means of controlling the fuel cell stack 21 communicates with the timer 41, and the timer 41 starts to measure time at step 52. The timer 41 communicates with the means of controlling the collector switch 40. When the timer 41 measures an interval of 15 minutes from the start of electrical generation, the means of controlling the collector switch 40 sets the collector switch 18, as noted at step 53. The time interval of 15 minutes is an empirically determined period sufficient for the polymer electrolyte membrane fuel cell stack 10 to heat up the anode-side sub-stack 15 and the cathode-side sub-stack 17 above 0° C. Consequently, when the collector switch 18 is set, as noted in step 53, the entire polymer electrolyte membrane fuel cell stack 10 is able to generate electricity.

EXAMPLE 3

Figure 5:
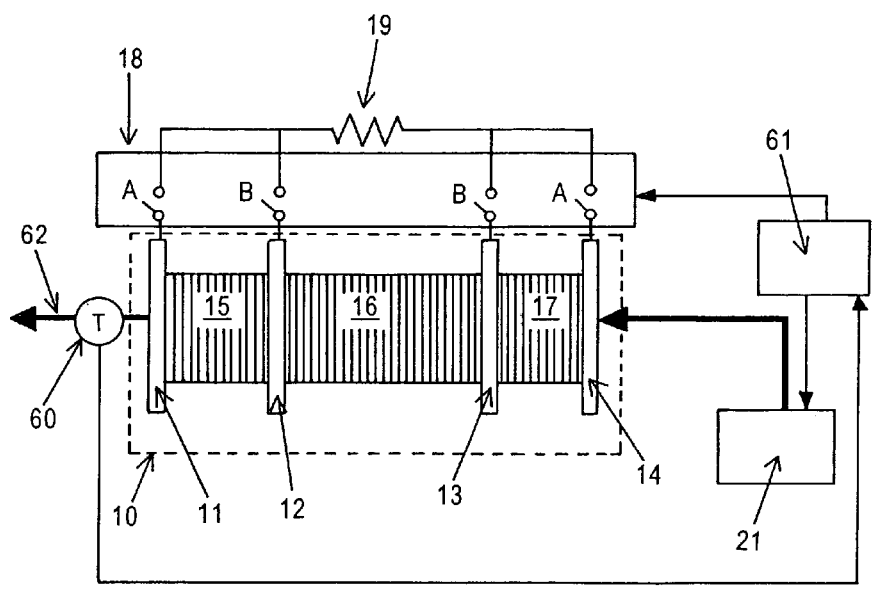
FIG. 5 schematically illustrates a cross-section of a fuel cell system according to another embodiment of the present invention.

FIG. 5 shows the outline of an embodiment of the present invention as described in Example 3. A coolant outlet temperature sensor 60 is provided in the coolant outlet pipe 62 of a polymer electrolyte membrane fuel cell stack 10. If the temperature measured by the coolant outlet temperature sensor 60 is 0° C. or lower, the means of controlling collector switch 61 determines that water in the interior of polymer electrolyte membrane fuel cell stack 10 is frozen and controls the collector switch 18 so that only the central sub-stack 16 can generate electricity. Subsequently, when electrical generation starts and the coolant outlet temperature sensor 60 measures a temperature exceeding 0° C., the means of controlling the collector switch 61 determines that the interior of the polymer electrolyte membrane fuel cell stack 10 has thawed, and controls the collector switch 18 so that the entire polymer electrolyte membrane fuel cell stack 10 can generate electricity.

EXAMPLE 4

Figure 6:
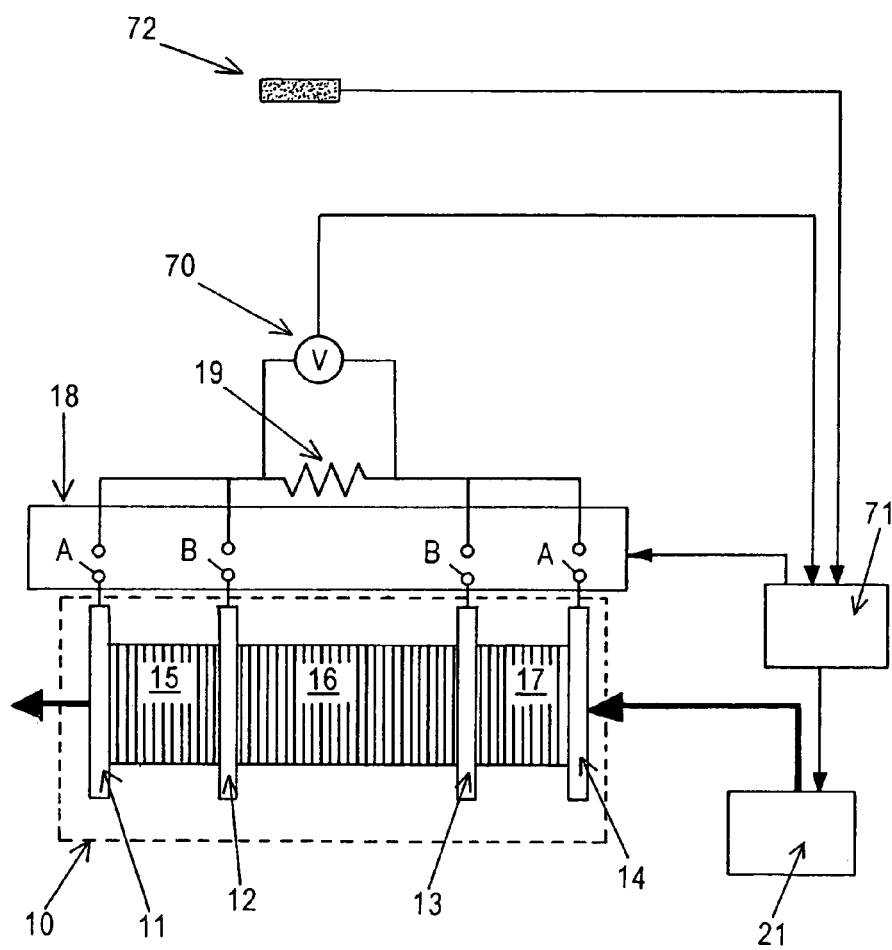
FIG. 6 schematically illustrates a cross-section of a fuel cell system according to another embodiment of the present invention.

FIG. 6 shows the outline of an embodiment of the present invention as described in Example 4. A voltmeter 70 is connected across load 19. The voltmeter communicates with the means of controlling the collector switch 71. An ambient temperature sensor 72 that communicates with the means of controlling the collector switch is also provided adjacent the polymer electrolyte membrane fuel cell stack 10.

If the ambient temperature sensor 72 measures 0° C. or below, the means of controlling the collector switch 71 determines that water is frozen in the interior of the polymer electrolyte membrane fuel cell stack 10, and controls the collector switch 18 so that only the central sub-stack 16 can generate electricity. After electrical generation starts and the voltmeter 70 measures a predetermined voltage, the means of controlling the collector switch 71 determines that the interior of polymer electrolyte membrane fuel cell stack 10 has thawed, and controls the collector switch 18 so that entire polymer electrolyte membrane fuel cell stack 10 can generate electricity. The predetermined voltage is empirically determined.

Figure 7:
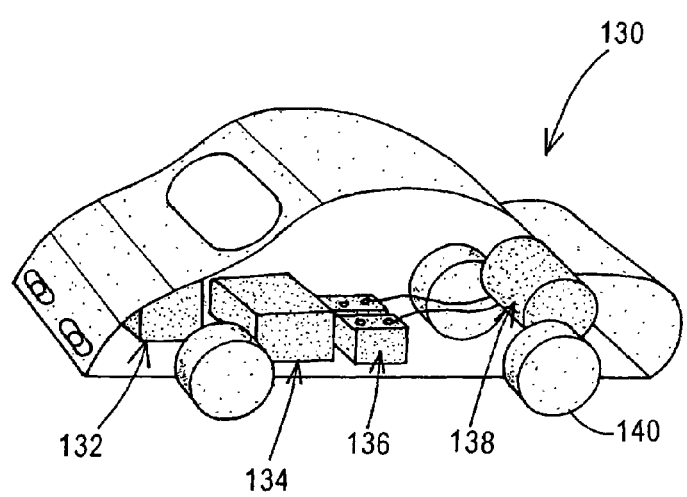
FIG. 7 illustrates an automobile with a fuel cell system according to an embodiment of the present invention.

In certain embodiments of the present invention, a motor vehicle is provided, such as an automobile 130, as shown in FIG. 7, comprising any of the fuel cell systems, as previously described herein. The automobile 130 comprises a fuel tank 132 to store the fuel required by the fuel cell 134 to generate electricity. The electricity generated by the fuel cell 134 is stored in one or more batteries 136. The electricity generated by the fuel cell and/or stored in one or more secondary batteries 136 is used to run the motor 138. The motor 138, in turn, spins the wheels 140 setting the automobile 130 in motion.

The embodiments illustrated in the instant disclosure are for illustrative purposes. They should not be construed to limit the scope of the claims. Though the fuel cell systems described are particularly well suited to electrical vehicles, such as automobiles, the instant fuel cell systems are suitable for a wide variety of motor vehicles that are included within the scope of the instant claims including, motorcycles, buses, trucks, recreational vehicles, and agricultural and industrial equipment. As is clear to one of ordinary skill in this art, the instant disclosure encompasses a wide variety of embodiments not specifically illustrated herein.

What is claimed is:

1. A method of generating electricity from a fuel cell system comprising:
   providing a fuel cell system, said fuel cell system comprising a fuel cell stack divided into an anode-side sub-stack, central sub-stack, and cathode-side sub-stack by current collectors positioned at each end of the fuel cell stack and two current collectors positioned at intermediate positions of the fuel cell stack, a collector switch that connects said current collectors positioned at each end of the fuel cell stack and said current collectors at intermediate positions to a load, a means of controlling the collector switch, and a means of measuring the temperature of the fuel cell stack;
   controlling said collector switch with said means of controlling the collector switch so that said central sub-stack generates electricity before said anode-side sub-stack and said cathode-side sub-stack start to generate electricity;
   measuring the temperature of said fuel cell stack using said means of measuring the temperature; and
   controlling said collector switch with said means of controlling the collector switch so that electricity is generated by the anode-side sub-stack, cathode-side sub-stack, and central sub-stack when said means of measuring the temperature of the fuel cell stack measures a temperature greater than or equal to a predetermined temperature.

2. The method according to claim 1, wherein the predetermined temperature is 0° C.

3. The method according to claim 1, wherein the means of controlling the collector switch controls the collector switch so that the anode-side and cathode-side sub-stacks immediately start to generate electricity when the means of measuring the temperature of the fuel cell stack measures a temperature greater than or equal to the predetermined temperature.

4. The method according to claim 1, wherein the means of measuring the temperature of the fuel cell stack measures the temperature of the surface or the interior of the central sub-stack and at least one of the surface or interior of either the cathode-side sub-stack or the anode-side sub-stack.

5. The method according to claim 1, wherein the fuel cell system generates electricity by supplying fuel gas and oxidant gas to the fuel cell stack, and heat generated by the fuel cell stack during the generation of electricity is removed by the action of a coolant liquid, wherein the means of measuring the temperature of the fuel cell stack measures the temperature of at least one of the fuel gas, the oxidant gas, or the coolant liquid discharged from the fuel cell stack.

6. A method of generating electricity from a fuel cell system comprising:
   providing a fuel cell system, said fuel cell system comprising a fuel cell stack divided into an anode-side sub-stack, central sub-stack, and cathode-side sub-stack by current collectors positioned at each end of the fuel cell stack and two current collectors positioned at intermediate positions of the fuel cell stack, a collector switch that connects said current collectors positioned at each end of the fuel cell stack and said current collectors at intermediate positions to a load, a means of controlling the collector switch, and a means of measuring the ambient temperature;
   controlling said collector switch with said means of controlling the collector switch so that said central sub-stack generates electricity before said anode-side sub-stack and said cathode-side sub-stack start to generate electricity;
   measuring the ambient temperature adjacent the fuel cell stack using said means of measuring the ambient temperature; and
   controlling said collector switch with said means of controlling the collector switch so that electricity is generated by the anode-side sub-stack, cathode-side sub-stack, and central sub-stack when said means of measuring the ambient temperature measures a temperature greater than or equal to a predetermined temperature.

7. The method according to claim 6, wherein the predetermined temperature is 0° C.

8. The method according to claim 6, wherein the means of controlling the collector switch controls the collector switch so that the anode-side and cathode-side sub-stacks immediately start to generate electricity when the means of measuring the ambient temperature measures a temperature greater than or equal to the predetermined temperature.

9. A method of generating electricity from a fuel cell system comprising:
   providing a fuel cell system, said fuel cell system comprising a fuel cell stack divided into an anode-side sub-stack, central sub-stack, and cathode-side sub-stack by current collectors positioned at each end of the fuel cell stack and two current collectors positioned at intermediate positions of the fuel cell stack, a collector switch that connects said current collectors positioned at each end of the fuel cell stack and said current collectors at intermediate positions to a load, a means of controlling the collector switch, and a timer;
   controlling said collector switch with said means of controlling the collector switch so that said central sub-stack generates electricity before said anode-side sub-stack and said cathode-side sub-stack start to generate electricity;

measuring time from the start of the generation of electricity by the central sub-stack using said timer; and controlling said collector switch with said means of controlling the collector switch so that electricity is generated by the anode-side sub-stack, cathode-side sub-stack, and central sub-stack when said timer measures a predetermined interval of time.

10. A method of generating electricity from a fuel cell system comprising:

providing a fuel cell system, said fuel cell system comprising a fuel cell stack divided into an anode-side sub-stack, central sub-stack, and cathode-side sub-stack by current collectors positioned at each end of the fuel cell stack and two current collectors positioned at intermediate positions of the fuel cell stack, a collector switch that connects said current collectors positioned at each end of the fuel cell stack and said current collectors at intermediate positions to a load, a means of controlling the collector switch, and a means for measuring the voltage of said central sub-stack;

controlling said collector switch with said means of controlling the collector switch so that said central sub-stack generates electricity before said anode-side sub-stack and said cathode-side sub-stack start to generate electricity;

measuring the voltage of the central sub-stack using said means of measuring the voltage; and controlling said collector switch with said means of controlling the collector switch so that electricity is generated by the anode-side sub-stack, cathode-side sub-stack, and central sub-stack when said means of measuring the voltage measures a voltage greater than or equal to a predetermined voltage.

11. A fuel cell system for generating electricity comprising:

a fuel cell stack divided into an anode-side sub-stack, central sub-stack, and cathode-side sub-stack by current collectors positioned at each end of the fuel cell stack and two current collectors positioned at intermediate positions of the fuel cell stack, wherein each of the anode-side sub-stack, central sub-stack, and cathode-side sub-stack comprises a plurality of unit cells;

a collector switch that connects said current collectors positioned at each end of the fuel cell stack and said current collectors at intermediate positions to a load;

a means of controlling the collector switch, wherein said means of controlling the collector switch controls the collector switch so that said central sub-stack generates electricity before said anode-side sub-stack and said cathode-side sub-stack start to generate electricity; and a plurality of means of measuring the temperature of said fuel cell stack, wherein one of said plurality of means of measuring the temperature of the fuel cell stack is positioned on or in the interior of said central sub-stack, and another of said plurality of means of measuring the temperature of the fuel cell stack is positioned on or in the interior of either the anode-side or cathode-side sub-stack.

12. The fuel cell system according to claim 11, wherein the anode-side sub-stack and the cathode-side sub-stack each comprise at least three unit cells.

13. The fuel cell system according to claim 11, further comprising a means of controlling the fuel cell stack, wherein the means of controlling the collector switch communicates with the means of controlling the fuel cell stack and the means of controlling the fuel cell stack communicates with the fuel cell stack.

14. A motor vehicle comprising the fuel cell system of claim 11.

15. The motor vehicle according to claim 14, wherein the motor vehicle is an automobile.

16. A fuel cell system for generating electricity comprising:

a fuel cell stack divided into an anode-side sub-stack, central sub-stack, and cathode-side sub-stack by current collectors positioned at each end of the fuel cell stack and two current collectors positioned at intermediate positions of the fuel cell stack, wherein each of the anode-side sub-stack, central sub-stack, and cathode-side sub-stack comprises a plurality of unit cells;

a collector switch that connects said current collectors positioned at each end of the fuel cell stack and said current collectors at intermediate positions to a load;

a means of controlling the collector switch, wherein said means of controlling the collector switch controls the collector switch so that said central sub-stack generates electricity before said anode-side sub-stack and said cathode-side sub-stack start to generate electricity; and a timer for measuring time from the start of the generation of electricity by the central sub-stack, wherein said timer communicates with the means of controlling the collector switch.

17. The fuel cell system according to claim 16, wherein the anode-side sub-stack and the cathode-side sub-stack each comprise at least three unit cells.

18. The fuel cell system according to claim 11, further comprising a means of controlling the fuel cell stack, wherein the means of controlling the collector switch communicates with the means of controlling the fuel cell stack, and the means of controlling the fuel cell stack communicates with the fuel cell stack and the timer.

19. A motor vehicle comprising the fuel cell system of claim 16.

20. The motor vehicle according to claim 19, wherein the motor vehicle is an automobile.

* * * * *